(12) United States Patent
Srinath (10) Patent No.: US 10,296,966 B2
(45) Date of Patent: May 21, 2019

(54) WIFI TRANSACTIONS (71) Applicant: PayPal, Inc., San Jose, CA (US)

(72) Inventor: Badrinath Vengalathur Srinath, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 519 days.

(21) Appl. No.: 15/046,247

(22) Filed: Feb. 17, 2016

(65) Prior Publication Data
US 2017/0236189 A1 Aug. 17, 2017

(51) Int. Cl.
*G06Q 30/00* (2012.01)
*G06Q 30/06* (2012.01)
*H04W 84/12* (2009.01)
*G06Q 20/40* (2012.01)

(52) U.S. Cl.
CPC ......... *G06Q 30/0635* (2013.01); *G06Q 20/40* (2013.01); *G06Q 30/0185* (2013.01); *H04W 84/12* (2013.01)

(58) Field of Classification Search
CPC ................ G06Q 30/0635; G06Q 30/00–30/08
See application file for complete search history.

(56) References Cited

U.S. PATENT DOCUMENTS

| 9,799,034 | B1 * | 10/2017 | Varma | G06Q 20/3224 |
| 2014/0108108 | A1 * | 4/2014 | Artman | G06Q 30/0261 705/14.1 |
| 2015/0221149 | A1 * | 8/2015 | Main | G07C 9/00119 340/5.61 |
| 2017/0083902 | A1 * | 3/2017 | Gilbey | G06Q 20/34 |

OTHER PUBLICATIONS

John Tierney et al. "The Future of retail Checkout: No Checkout at all?", May 9, 2014, The Atlantic. "https://www.theatlantic.com/business/archive/2014/05/whats-ahead-with-the-retail-checkout-experience/362017/" (Year: 2014).*

* cited by examiner

*Primary Examiner* — Michael Misiaszek
*Assistant Examiner* — Jason B Warren
(74) *Attorney, Agent, or Firm* — Haynes and Boone LLP (57) ABSTRACT

Systems and methods for facilitating WiFi transactions are provided. A consumer device logs in to a merchant's WiFi network and a tab for the consumer is opened up with the merchant. The merchant adds items ordered by the consumer to the tab until the consumer decides to close the tab. The consumer can close the tab by logging off the merchant's WiFi network, pressing a button on a mobile device indicating that he or she wants to settle the tab, or specifying that the tab should be closed after a certain amount of time.

20 Claims, 3 Drawing Sheets

WIFI TRANSACTIONS

BACKGROUND

The present invention generally relates to facilitating transactions, and more specifically to facilitating transactions by connecting to a WiFi network.

Consumers across the world want to stay connected. Thus, most merchants offer free Internet. Consumers can pay a merchant via mobile phones or cash, but the payment process can get complicated when the consumer is busy, rushed, and/or impaired.

For example, consumers frequently open "a tab" with a bartender when visiting a bar. Opening a tab often entails the consumer giving the bartender a credit card (or some other form of collateral) to serve as security for purchases while at the bar. At the conclusion of the consumer's stay, the consumer typically closes out the tab with the bartender. Frequently, the consumer is too intoxicated to close the tab and simply walks out of the bar, forgets to sign a credit card slip or take back the credit card, or fails to write numbers clearly, thus leading to problems with the bartender collecting payment and inconvenience for the consumer, such as having to return to the bar to retrieve the consumer's credit card.

Accordingly, a need exists for systems and methods that provide a mechanism to allow transactions with a consumer overcome the disadvantages discussed above.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure is directed to facilitating transactions of a consumer with a merchant. In particular, the present disclosure describes automatically opening up a tab for a consumer with a merchant when the consumer logs in to a WiFi network, and closing the tab for the consumer when the consumer exits the WiFi network. WiFi is a popular wireless and relatively recent networking technology that allows an electronic device to exchange data wirelessly with radio waves over a computer network, including high-speed Internet connections. WiFi networks can be open so that anyone can use them, or closed, in which case a password is needed to connect to the network.

In several embodiments, once the consumer is logged in to a WiFi network associated with a merchant, a tab is opened up for the consumer with the merchant. A consumer can log in to the WiFi network in a variety of ways. For example, the consumer can log in by using his or her payment service provider password. This can be the case when the payment service provider provides the WiFi, or when the WiFi is provided by the merchant, but the payment service provider and the merchant have partnered together.

In another embodiment, a router/modem at the physical merchant location is provided by the payment service provider. The router recognizes the consumer's user device (because the user device has logged in previously to a payment service provider website) and automatically logs the consumer in to the WiFi network. In a third embodiment, the consumer installs a mobile application ("app") provided by the payment service provider. The consumer logs in to the mobile app using his or her payment service provider username and password. The payment service provider then provides the consumer with the password for the WiFi network. In a fourth embodiment, the WiFi is provided by the payment service provider. When the consumer selects the merchant's WiFi network, the consumer is asked if he or she wants to open a tab. If the consumer answers yes, then he or she provides his or her payment service provider user identification number, and the consumer is logged in to the WiFi network.

In several embodiments, once the consumer connects to the merchant's WiFi network, the merchant can see the consumer's picture on their point of sale (POS) system. This picture allows the merchant to identify the consumer as the rightful owner of the account that will be charged. For example, the consumer's picture can pop up on a cash register screen or POS terminal, to give the merchant a way to verify that the consumer paying the bill is actually located on the physical premises of the merchant. Similar to the way a credit card is used, the merchant can add items to the consumer's tab and keep a running tally on what the consumer has ordered. In this way, opening a tab with the merchant is easier.

When the consumer wants to close his or her tab and pay the bill, the consumer can ask the merchant to close the tab, or the consumer can log off the WiFi network associated with the merchant. The consumer can log off the WiFi network in a variety of ways. The consumer can physically sign out of the network on a user device. In another example, the consumer can leave the area where the WiFi network is available. In certain embodiments, once the consumer moves out of the WiFi region, the tab is automatically closed, and the merchant cannot add anything else to the consumer's bill. In other embodiments, to prevent unauthorized use of the consumer's account, the consumer can specify that the tab be automatically closed after a certain amount of time (e.g., a half hour or an hour) has passed, or after a certain amount of money has been charged to the consumer's account. In this way, closing a tab is made easier, and a merchant is covered for a consumer who "forgets" to pay.

In one embodiment, the WiFi is provided by a payment service provider. In another embodiment, the WiFi is provided by the merchant. In certain embodiments, multiple WiFi networks may be available to the consumer at one location. Each WiFi network may include a respective operating area that relates to physical locations in which a user device can be disposed to connect to the WiFi networks. The operating areas of the WiFi networks may be isolated or may overlap with other operating areas of different WiFi networks. When the user device is located in an area in which more than one operating area overlaps, the user device may connect to any WiFi network in which the operating area is present at the location of the user device. With multiple possible WiFi networks for the user device to connect, the consumer can select the appropriate WiFi network manually, or the consumer can be connected automatically to a pre-selected WiFi network. In another embodiment, the consumer may be automatically connected to the WiFi network with the strongest signal or stronger by a threshold amount to the next strongest signal (under the assumption that the consumer is at the physical location providing the strongest WiFi signal).

In areas where merchants are spaced closely together, there may be several WiFi networks available, which may result in overlapping signals. Thus, as the consumer moves from one location to another, he or she may be signing on and off multiple networks. To prevent a constant signing on and off within a short or brief span of time, the consumer can choose to open multiple tabs with multiple merchants, or choose to open a single tab with a single merchant at a time. As used herein, the terms "short" or "brief" with respect to time is meant less than about 15 minutes, such as less than 10 minutes or 5 minutes. This time can also be preset by the consumer and can vary based on the consumer's expectation of how long the consumer will be at a particular location. When the WiFi network switches from a first WiFi network associated with first merchant to a second WiFi network associated with a second merchant, the consumer can specify that the tab from the first merchant should remain open for a specific amount of time to prevent a tab for the second merchant from automatically opening and the tab for the first merchant from prematurely closing.

In certain embodiments, the consumer is automatically logged in and logged off a WiFi network based on a detected location and signal strength. For example, as a consumer is detected moving away and out of the geofence of a first merchant and towards the geofence of a second merchant, coupled with an indication of decreased WiFi strength from the first merchant and a stronger WiFi strength of the second merchant, the consumer device will log the consumer off from the WiFi network of the first merchant and log the consumer in to the WiFi network of the second merchant.

In various embodiments, once the tab is closed, the consumer receives a message on his or her user device. The message can ask the consumer to confirm that the tab should be closed and that the bill should be settled (and a tip added), or ask the consumer if he or she wants the tab to remain open. If the consumer wants the tab to remain open, the tab can be re-opened so that the consumer can continue to be charged. In other embodiments, the message can provide an opportunity for the consumer to add a tip, and then click "pay," which completes the transaction. The payment service provider processes the transaction (e.g., transfers a payment amount from a consumer account to a merchant account), sends information to the merchant (e.g., to the POS terminal) that the transaction is complete, and provides a digital receipt to the consumer on the user device.

Should the consumer accidentally or unintentionally leave his or her user device at the physical location of the merchant, various safeguards may be in place to prevent unauthorized use of the consumer's account. For example, most user devices already have built in security that prevents unauthorized use of the user device (e.g., passcode). In addition, the merchant has the "real" consumer's photo on the POS terminal so the merchant can identify an unauthorized person attempting to use the consumer's account. Furthermore, in certain embodiments, there is a timer associated with the tab that automatically closes the tab after a certain amount of time has passed without activity. For example, if nothing has been added to the tab in 30 minutes, the tab may be automatically closed and settled.

Advantageously, the consumer's account, tab, or bill is easily opened with the merchant when the consumer selects or logs in to the merchant's WiFi network on the user device. The merchant is notified that the consumer is connected to the WiFi network, and can add items ordered by the consumer onto the consumer's bill. To prevent fraud and provide increased security, a picture of the consumer can be transmitted to the merchant.

The consumer's tab with the merchant is easily closed or settled with the merchant once the consumer's device is logged out of the merchant's WiFi network, such as by leaving the operating area of the WiFi network (e.g., leaving the physical premises or geofence of the merchant). This ensures that the merchant is paid for the items ordered by the consumer.

In addition, this may address consumer issues that may be found in everyday transactions at POS locations such as restaurants or retail stores. For example, in a crowded restaurant setting, it may be difficult for a customer to get the attention of a server once the customer has finished a meal and wants to pay because the server may be busy with other customers. The customer wastes time trying to wave down a server and may become frustrated with an annoying end to a nice meal. Using features described herein, the customer is now able to leave and have the bill paid automatically without having to wait for the server.

The opening and closing of a consumer tab is specifically linked or tied to the user device, such that the user device is utilized in a non-traditional and non-conventional manner. For example, opening and closing of a consumer tab based on a location of a user device and strength of a WiFi signal is not conventional. A consumer tab with a merchant is opened when the user device connects to a WiFi network associated with the merchant. The consumer tab is closed and settled when the user device disconnects from the WiFi network.

Figure 1:
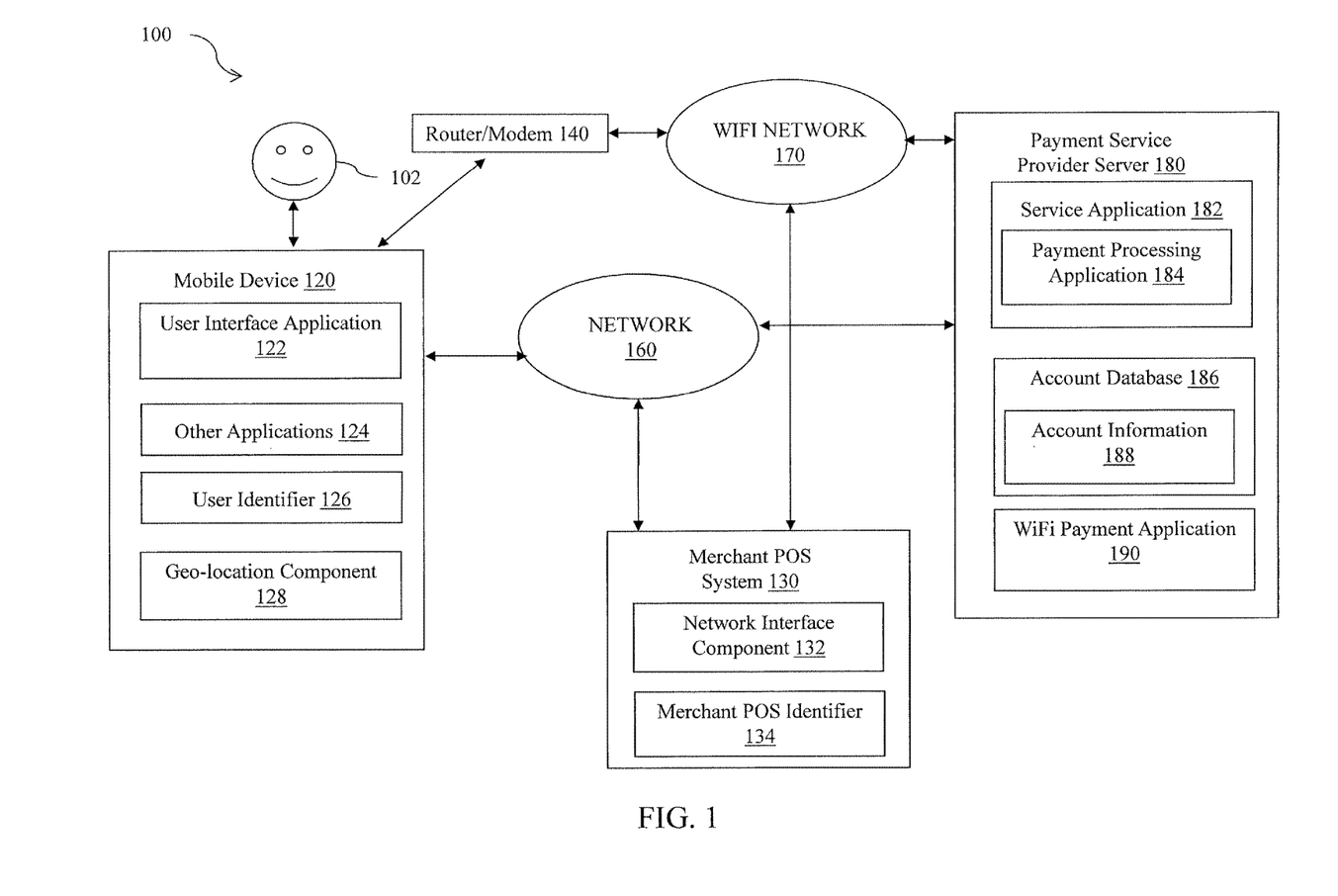
FIG. 1 is a block diagram illustrating a system for facilitating WiFi transactions according to an embodiment of the present disclosure.

FIG. 1 shows one embodiment of a block diagram of a network-based system 100 that is configured to facilitate WiFi transactions according to an embodiment of the present disclosure. Any of the systems or machines shown in FIG. 1 may be, include, or otherwise be implemented in a special-purpose (e.g., specialized or otherwise non-generic) computer that has been modified to perform one or more functions described herein for that system or machine. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, system 100 includes a mobile device 120 (e.g., a smartphone), a merchant POS system or terminal 130, a router/modem 140, and a payment service provider server or device 180 (e.g., network server device) in communication over a network 160. Network 160, in one embodiment, may be implemented as a single network or a combination of multiple networks. For example, in various embodiments, network 160 may include the Internet and/or one or more intranets, landline networks, wireless networks (e.g., WiFi networks), and/or other appropriate types of communication networks. In another example, network 160 may comprise a wireless telecommunications network (e.g., cellular phone network) adapted to communicate with other communication networks, such as the Internet.

Mobile device 120, in one embodiment, is utilized by a consumer 102 to interact with payment service provider server 180 over network 160. Mobile device 120, in various embodiments, may be implemented using an appropriate combination of hardware and/or software configured for wired and/or wireless communication over network 160 and for performing the functions described herein. In various implementations, mobile device 120 may include at least one of a smartphone, wireless cellular phone, satellite phone, tablet (e.g., iPad™ from Apple®), laptop computer, wearable device (e.g., smart watch or Google Glass), notebook computer, and/or other types of computing devices.

Mobile device 120, in one embodiment, includes a user interface application 122, which may be utilized by consumer 102 to access applications and to provide instructions to payment provider server 180 over network 160. In one aspect, consumer 102 may log in to an account related to consumer 102 via user interface application 122.

In one implementation, user interface application 122 comprises a software program, such as a graphical user interface (GUI), executable by a processor that is configured to interface and communicate with payment service provider server 180 via network 160. In another implementation, user interface application 122 comprises a browser module that provides a network interface to browse information available over network 160. For example, user interface application 122 may be implemented, in part, as a web browser to view information available over network 160.

Mobile device 120, in various embodiments, may include other applications 126 as may be desired in one or more embodiments of the present disclosure to provide additional features available to consumer 102. In one example, such other applications 126 may include security applications for implementing client-side security features, calendar application, contacts application, location-based services application, programmatic client applications for interfacing with appropriate application programming interfaces (APIs) over the network 160, and/or various other types of generally known programs and/or software applications. In still other examples, other applications 126 may interface with user interface application 122 for improved efficiency and convenience.

Mobile device 120, in one embodiment, may include at least one user identifier 128, which may be implemented, for example, as operating system registry entries, cookies associated with user interface application 122, identifiers associated with hardware of mobile device 120, or various other appropriate identifiers. User identifier 128 may include one or more attributes related to consumer 102, such as personal information related to consumer 102 (e.g., one or more user names, passwords, photograph images, biometric IDs, addresses, phone numbers, social security number, etc.). In various implementations, user identifier 128 may be passed with a user login request to payment service provider server 180 via network 160, and user identifier 128 may be used by payment service provider server 180 to associate consumer 102 with a particular user account maintained by payment service provider server 180.

Mobile device 120, in various embodiments, includes a geo-location component 128 configured to determine, track, monitor, and/or provide an instant geographical location of mobile device 120. Mobile device 120 can determine a current location of mobile device 120 using various location determination techniques. For example, mobile device 120 can determine a current location using a Global Positioning System (GPS) signal, by triangulating positions of wireless access points, or by a current cell identifier of a cellular communications network.

In one implementation, the geographical location may include GPS coordinates, zip-code information, area-code information, street address information, and/or various other generally known types of location information. In one example, the location information may be directly entered into mobile device 120 by user 102 via a user input component, such as a keyboard, touch display, and/or voice recognition microphone. In another example, the location information may be automatically obtained and/or provided by the mobile device 120 via an internal or external monitoring component that utilizes a GPS, which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using mobile device 120 via a check-in device at a location, such as a wireless beacon (e.g., Bluetooth beacon or Bluetooth low energy (BLE) beacon). This helps to save battery life and to allow for better indoor location where GPS typically does not work.

Merchant POS system or terminal 130, in various embodiments, is provided by a payment service provider and maintained by one or more business entities (or in some cases, by a partner of a business entity that processes transactions on behalf of business entities). Merchant POS system 130 may be connected to a merchant server (not shown), which communicates with payment service provider 180, or merchant POS system 130 may communicate directly with payment service provider server 180. Examples of businesses entities include merchants, resource information companies, utility companies, real estate management companies, social networking companies, etc., which offer various items for purchase and payment.

Merchant POS system 130, in one embodiment, may include at least one network interface component (NIC) 132 adapted to communicate with the network 160. In various examples, the network interface component 132 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Merchant POS system 130, in one embodiment, may include one or more merchant POS identifiers 134, which may be implemented as operating system registry entries, cookies, identifiers associated with hardware of the merchant POS system 130, and/or various other appropriate identifiers. The merchant POS identifier 134 may include attributes related to the merchant POS system 130, such as identification information (e.g., an POS serial number, a location address, Global Positioning System (GPS) coordinates, a network identification number, etc.) and network information (e.g., network owner, network provider, network administrator, network security information, etc.). In various implementations, the merchant POS identifier 134 may be passed with network traffic data and information to the payment service provider server 180, and the merchant POS identifier 134 may be used by the payment service provider server 180 to associate the merchant POS system 130 with one or more particular merchant accounts maintained by the payment service provider server 180.

In general, a POS system, such as merchant POS system 130, is a computerized replacement for a cash register. Much more complex than the cash registers of even just a few years ago, the merchant POS system 130 can include an ability to record and track customer orders, process credit and debit cards, connect to other systems in a network, and manage inventory. Generally, the merchant POS system 130 has as its core a personal computer, which is provided with application-specific programs and input/output (I/O) devices for the particular environment in which it will serve.

Router/modem 140, in various embodiments, is provided by a payment service provider to a merchant and is located on the physical premises or geofence of the merchant. According to several exemplary embodiments, router/modem 140 includes a wireless router. Router/modem 140 functions to connect mobile device 120 to WiFi network 170 so that an account with a merchant can be readily opened and closed. Router/modem 140 and WiFi network 170 is associated with a password and network name (or the Service Set Identifier "SSID"). To achieve connection with router/modem 140, mobile device 120 must select the network name of WiFi network 170 and provide the correct password.

In some embodiments, router/modem 140 is integrated with merchant POS system 130. This allows for more flexibility in caching transactions and sending the transactions to the payment service provider server 180 in an asynchronous fashion. For example, the router/modem 140 can have the hardware, software, and/or chipset similar to merchant POS system 130 and therefore be capable of doing some of the processes of the merchant POS system 130. For example, the router/modem 140 can send transactions to the server 180.

Payment service provider server 180, in various embodiments, may be maintained by a payment service provider that provides online services and/or processing for information and/or financial transactions. As such, payment service provider server 180 includes a service application 182, which may be adapted to interact with the mobile device 120 over the network 160 to facilitate the receipt and analysis of information from mobile device 120. In one example, payment service provider server 180 may be provided by a service provider such as PayPal®, Inc. of San Jose, Calif., USA.

The payment service provider server 180, in one embodiment, may be configured to maintain one or more user accounts and merchant accounts in an account database 186 each of which may include account information 188 associated with one or more individual users (e.g., consumer 102) and merchants (e.g., merchant associated with merchant POS system 130). For example, account information 188 may include private financial information of user 202, such as one or more account numbers, passwords, credit card information, banking information, or other types of financial information, which may be used to facilitate financial transactions between user 202 and a merchant. In various aspects, the methods and systems described herein may be modified to accommodate users and/or merchants that may or may not be associated with at least one existing user account and/or merchant account, respectively.

In one implementation, the consumer 102 may have identity attributes stored with the payment service provider server 180, and consumer 102 may have credentials to authenticate or verify identity with the payment service provider server 180. User attributes may include personal information, banking information and/or funding sources. In various aspects, the user attributes may be passed to the service provider server 180 as part of a login, search, selection, purchase, and/or payment request, and the user attributes may be utilized by the payment service provider server 180 to associate consumer 102 with one or more particular user accounts maintained by the payment service provider server 180.

In various embodiments, service provider server 180 utilizes a WiFi payment application 190 to facilitate WiFi transactions. In various embodiments, the WiFi payment application 190 receives a request to connect to WiFi network 170 from consumer 102 and provides consumer 102 with the appropriate password to connect. WiFi payment application 190 can receive notification from router/modem 140 that consumer 102 has connected to WiFi network 170 and can open up an account for consumer 102 with the merchant. WiFi payment application 170, in some embodiments, retrieves a picture of consumer 102 from account database 186 and transmits the picture to merchant POS system 130 for display. When consumer 102 leaves or logs out of WiFi network 170, router/modem 140 can inform WiFi payment application 190, and WiFi payment application 190 can close consumer 102's account with the merchant and process payment to the merchant. WiFi payment application 190 then provides information to the merchant (e.g., by transmitting the information to merchant POS system 130) that consumer 102 has paid his or her tab and provides a receipt to mobile device 120. In various embodiments, WiFi payment application 190 requests confirmation from consumer 102 via mobile device 120 that the tab should be paid and if a tip should be added before processing payment to the merchant.

In embodiments where multiple WiFi networks are available, WiFi payment application 190 can open multiple consumer accounts with multiple merchants, and can associate a timer with each of the consumer accounts. For example, consumer 202 may have specified that his or her tab with merchant A be open for 45 minutes and that his or her tab with merchant B be open for 2 hours. WiFi payment application 190 can determine how long a tab has been opened with merchant A and close the tab once the specified time has run. In some embodiments, WiFi payment application 190 automatically closes the consumer tab after the specified time has run.

In certain embodiments, consumer 102 may specify a limit to how much can be charged to the consumer account with the merchant. For example, consumer 102 indicates that only $300 can be charged on his account with merchant A and only $175 can be charged on his account with merchant B. WiFi payment application 190 can close and settle the consumer's 102's tab with merchant A and/or merchant B once their respective limits have been reached. In other embodiments, consumer 102 may specify both a time limit and a maximum amount to be charged.

Figure 2:
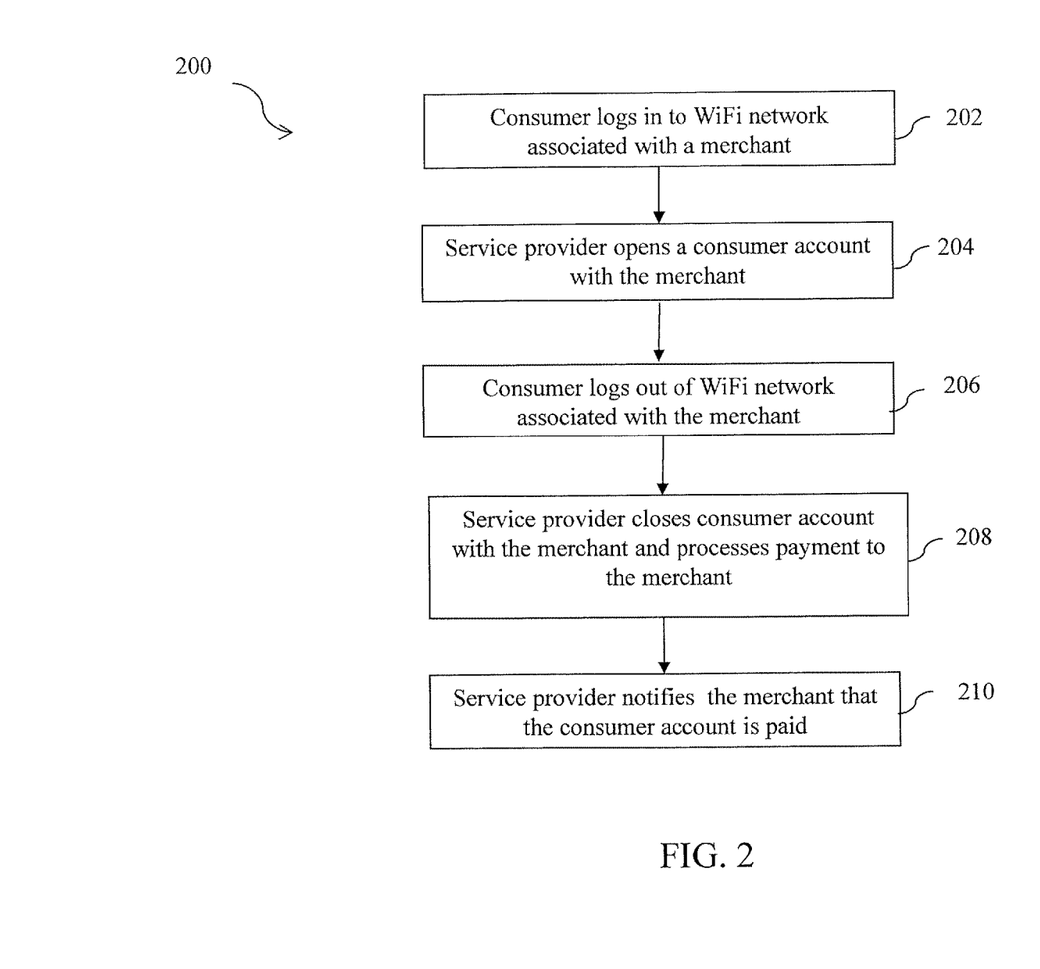
FIG. 2 is a flowchart showing a method of facilitating WiFi transactions according to an embodiment of the present disclosure.

Referring now to FIG. 2, a flowchart of a method 200 of facilitating a WiFi transaction is described. In various embodiments, a consumer registers with the payment service provider, which runs a mobile application. Registration may include signing up for the service and agreeing to any terms required by the payment service provider, such as through a user device. In one embodiment, the user device is a mobile computing device, such as a smart phone, a PC, or a computing tablet. In other embodiments, registration may be done completely through the user device, partially through the user device, or without using the user device, such as through a phone call or in-person visit to a representative of the payment service provider.

The consumer may be requested to provider specific information for registration, such as, but not limited to, a name, address, phone number, email address, picture, a user name for the account, and a password or PIN for the account. The type of information may depend on whether the consumer already has an account with the payment service provider. Requested information may be entered through the user device or other means, including voice or manual key entry. Once all the requested information is received and confirmed, the payment service provider may create an account for the consumer.

The consumer 102 enters a physical store of a merchant (e.g., restaurant or bar) that offers multiple items (e.g., goods and/or services) for sale and wireless Internet access. Once the consumer 102 enters the operating area of WiFi network 170 associated with the merchant, the consumer 102 at step 202 can log on to WiFi network 170 via router/modem 140. In cases where there are multiple WiFi networks available, the consumer 102 can select the WiFi network that he or she wants to connect to. In some embodiments, mobile device 120 determines the location of consumer 102 and checks the signal strength of the various WiFi networks at the location of consumer 102. The mobile device 120 connects to a first WiFi network based on location and signal strength. When mobile device 120 detects that the location of consumer 102 has changed and that the WiFi signal strength of the first WiFi network has become weaker, mobile device 120 can automatically log mobile device 120 off the first WiFi network and automatically log mobile device 120 to a second WiFi network with a stronger signal and that is associated with the changed location of consumer 102.

As described above, there are multiple ways the consumer 102 can log in to WiFi network 170. For example, the consumer 102 can log in to a mobile application provided by the payment service provider. The payment service provider server 180 receives authentication information (e.g., username and password) from the mobile device 120, and once the consumer 102 is authenticated, the payment service provider server 180 provides the WiFi network password to the consumer 102 on the mobile device 120. The consumer inputs the WiFi network password to access WiFi network 170.

In another example, router/modem 140 recognizes mobile device 120 (e.g., via user identifier 126) as having previous interactions with the payment service provide server 180. The payment service provider server 180 provides the WiFi network password to mobile device 120 and automatically logs the mobile device 120 in to WiFi network 170. In yet another embodiment, when the consumer 102 selects WiFi network 170, the consumer 102 is asked if a tab with the merchant should be opened. If the consumer 102 answers yes, then the consumer 102 provides his or her payment service provider user identification number, which is received by the payment service provider server 180. The payment service provider server 180 provides the WiFi network password to mobile device 120 and the consumer 102 is logged into WiFi network 170.

Once the consumer 102 is logged in to WiFi network 170, at step 204, the payment service provider server 180 opens up a tab or account with the merchant. In some embodiments, payment service provider server 180 causes a picture of the consumer 102 to be displayed on the merchant POS system or terminal 130. In embodiments where the merchant is a restaurant, the restaurant owner (or manager or waiter) can see the consumer 102 and make sure that the consumer 102 is actually at the location of the restaurant before adding items to the consumer's account.

As the consumer 102 orders items from the merchant, the merchant adds the cost of the items to the consumer 102's tab. For example; if the consumer 102 or someone at the consumer 102's table orders a pizza and beer, the cost of the pizza and beer are added to the consumer 102's tab.

Once the consumer 102 is finished ordering, at step 206, the consumer 102 logs out of WiFi network 170 to close the tab with the merchant. As described above, the consumer 102 can manually log off of WiFi network 170 to indicate that he or she wants to settle the tab or can press a "pay" button on mobile device 120. In certain embodiments, the consumer 102 can close the tab with the restaurant by getting up and leaving the restaurant. Once the mobile device 120 leaves the operating area of WiFi network 170, the merchant can no longer add items to the consumer 102's account. This prevents unauthorized orders to the consumer 102's account.

At step 208, payment service provider server 180 receives notification that the consumer 102 has closed his or her tab with the merchant and processes payment to the merchant for the items in the consumer 102's account. For example, the payment service provider server 180 transfers funds from a consumer account with the payment service provider to a merchant account with the payment service provider.

At step 210, the payment service provider server 180 notifies the merchant (e.g., via merchant POS system 130) that the consumer 102's tab has been paid and provides a receipt to the consumer 102 on the mobile device 120.

Advantageously, if the consumer is in a rush and cannot wait for a check, the consumer can leave the premises of the merchant and know that the bill will be paid for. In some cases, even if the consumer is too impaired to pay the bill, once he or she leaves the physical location of the merchant, the bill is settled and taken care of. In this way, merchants are ensured that they will be paid for their items and/or services.

Figure 3:
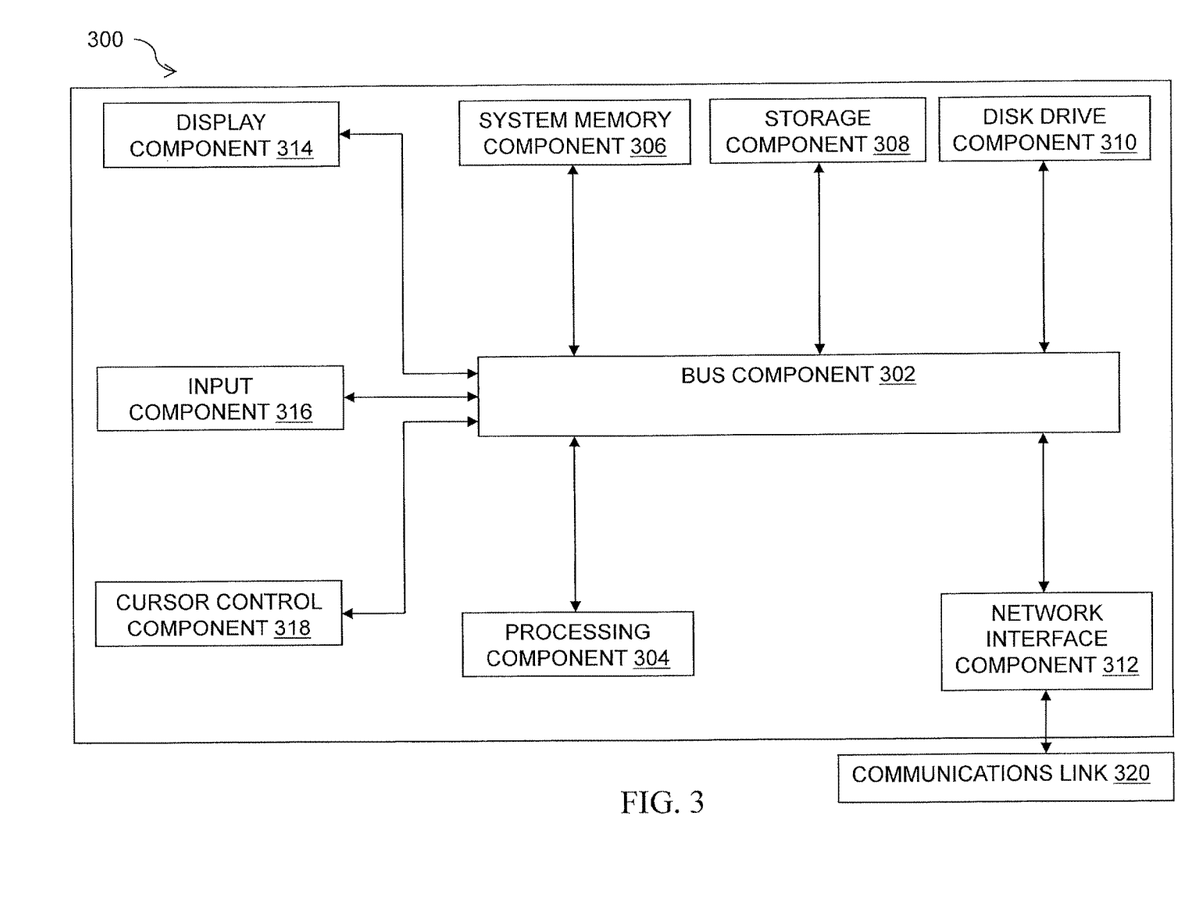
FIG. 3 is a block diagram of a system for implementing one or more components in FIG. 1 according to an embodiment of the present disclosure.

Referring now to FIG. 3 a block diagram of a system 300 is illustrated suitable for implementing embodiments of the present disclosure, including mobile device 120, merchant POS system 130, router/modem 140, and payment service provider server or device 180. System 300, such as part of a cell phone, a tablet, a personal computer and/or a network server, includes a bus 302 or other communication mechanism for communicating information, which interconnects subsystems and components, including one or more of a processing component 304 (e.g., processor, micro-controller, digital signal processor (DSP), etc.), a system memory component 306 (e.g., RAM), a static storage component 308 (e.g., ROM), a network interface component 312, a display component 314 (or alternatively, an interface to an external display), an input component 316 (e.g., keypad or keyboard), and a cursor control component 318 (e.g., a mouse pad).

In accordance with embodiments of the present disclosure, system 300 performs specific operations by processor 304 executing one or more sequences of one or more instructions contained in system memory component 306. Such instructions may be read into system memory component 306 from another computer readable medium, such as static storage component 308. In other embodiments, hardwired circuitry may be used in place of or in combination with software instructions for implementation of one or more embodiments of the disclosure.

Logic may be encoded in a computer readable medium, which may refer to any medium that participates in providing instructions to processor 304 for execution. Such a medium may take many forms, including but not limited to, non-volatile media, volatile media, and transmission media. In various implementations, volatile media includes dynamic memory, such as system memory component 306, and transmission media includes coaxial cables, copper wire, and fiber optics, including wires that comprise bus 302. Memory may be used to store user information (e.g., contact information). In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 300. In various other embodiments, a plurality of systems 300 coupled by communication link 320 (e.g., network 160 of FIG. 1, LAN, WLAN, PTSN, or various other wired or wireless networks) may perform instruction sequences to practice the disclosure in coordination with one another. Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

In view of the present disclosure, it will be appreciated that various methods and systems have been described according to one or more embodiments for facilitating WiFi transactions.

Although various components and steps have been described herein as being associated with mobile device 120, merchant POS system 130, router/modem 140 and payment service provider server or device 180 of FIG. 1, it is contemplated that the various aspects of such servers illustrated in FIG. 1 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, mobile device, server, and other devices described herein.

What is claimed is:

1. A system for facilitating WiFi transactions, comprising:
a non-transitory memory; and
one or more hardware processors coupled to the non-transitory memory and configured to read instructions from the non-transitory memory to cause the system to perform operations comprising:
   receiving, from a mobile device of a consumer, a request to connect to a WiFi network associated with a merchant via a router located at a physical location of the merchant;
   in response to receiving authentication data associated with an account of the consumer with a payment service provider, providing the mobile device access to the WiFi network based on the authentication data;
   in response to providing the mobile device access to the WiFi network, establishing a payment session between the consumer and the merchant using the account of the consumer with the payment service provider to enable the merchant to add one or more items to a purchase transaction between the consumer and the merchant;
   transmitting, to a point of sale (POS) device of the merchant at the physical location, a notification indicating that the payment session has been established for the consumer, wherein the notification further comprises a picture associated with the consumer;
   receiving, from the merchant, a request to add the one or more items to the purchase transaction through the payment session;
   determining that the mobile device is disconnected from the WiFi network; and
   in response to determining that the mobile device is disconnected from the WiFi network, processing the purchase transaction using the account of the consumer and terminating the payment session.

2. The system of claim 1, wherein providing the mobile device access to the WiFi network comprises transmitting a password associated with the WiFi network to the mobile device.

3. The system of claim 1, wherein the operations further comprise determining that the payment session is associated with one or more limits.

4. The system of claim 3, wherein the one or more limits comprise at least one of a time limit indicating a maximum duration of the payment session or a payment limit indicating a maximum amount chargeable to the account during the payment session.

5. The system of claim 4, wherein the operations further comprise:
   determining that at least one of the time limit or the payment limit has been reached; and
   in response to determining that at least one of the time limit or the payment limit has been reached, automatically terminating the payment session to disable the merchant from adding items to the purchase transaction.

6. The system of claim 1, wherein determining that the consumer is disconnected from the WiFi network comprises determining that the mobile device is located outside a predetermined distance from the physical location of the merchant.

7. The system of claim 1, wherein the operations further comprise providing, to the POS device of the merchant, a confirmation that the payment transaction has been processed using the account of the consumer.

8. The system of claim 1, wherein the operations further comprise providing, to the mobile device, a receipt associated with the processing of the payment transaction.

9. The system of claim 1, wherein the operations further comprise:
   receiving, from the mobile device of the consumer, a request to connect to a second WiFi network associated with a second merchant; and
   in response to receiving second authentication data associated with a second account with the payment service provider, (i) providing the mobile device access to the second WiFi network and (ii) establishing a second payment session between the consumer and the second merchant using the second account of the consumer.

10. A method of facilitating WiFi transactions, comprising:
   receiving, by one or more hardware processors of a payment service provider from a mobile device of a consumer, a request to connect to a WiFi network associated with a merchant via a router located at a physical location of the merchant;
   in response to receiving, from the mobile device, authentication data associated with an account with the payment service provider, providing, by the one or more hardware processors, the mobile device access to the WiFi network associated with the merchant based on the authentication data;
   establishing, by the one or more hardware processors, a payment session between the consumer and the merchant using the account of the consumer with the payment service provider to enable the merchant to add one or more items to a purchase transaction between the consumer and the merchant;
   transmitting, by the one or more hardware processors to a point of sale (POS) device of the merchant at the physical location, a notification indicating that the payment session has been established for the consumer;
   receiving, by the one or more hardware processors from the merchant, a request to add the one or more items to the purchase transaction through the payment session;
   determining, by the one or more hardware processors, that the mobile device is disconnected from the WiFi network associated with the merchant;
   in response to determining that the mobile device is disconnected from the WiFi network, processing, by the one or more hardware processors, the purchase transaction using the account of the consumer; and
   terminating, by the one or more hardware processors, the payment session.

11. The method of claim 10, further comprising determining a time limit for the payment session.

12. The method of claim 11, further comprising:
   determining that the time limit has been reached; and
   in response to determining that the time limit has been reached, terminating the payment session to disable the merchant from adding additional items to the purchase transaction.

13. The method of claim 10, further comprising causing a picture of the consumer to be displayed on the POS device of the merchant.

14. The method of claim 10, further comprising determining one or more limits for the payment session between the consumer and the merchant.

15. The method of claim 14, wherein the one or more limits comprises at least one of a time limit indicating a maximum duration of the payment session or a payment limit indicating a maximum amount chargeable during the payment session.

16. A non-transitory machine-readable medium having stored thereon machine-readable instructions executable to cause a machine to perform operations comprising:
   receiving, from a mobile device of a consumer, a request to connect to a WiFi network associated with a merchant via a router located at a physical location of the merchant;
   in response to receiving authentication data associated with an account with a payment service provider, providing the mobile device access to the WiFi network based on the authentication data;
   in response to determining that the mobile device is connected to the WiFi network, establishing a payment session between the consumer and the merchant using the account of the consumer with the payment service provider to enable the merchant to add one or more items to a purchase transaction between the consumer and the merchant;
   receiving, from the merchant, a request to add the one or more items to the purchase transaction through the payment session;
   determining that the mobile device is disconnected from the WiFi network; and
   in response to determining that the mobile device is disconnected from the WiFi network, automatically terminating the payment session between the consumer and the merchant to disable the merchant from adding additional items to the purchase transaction.

17. The non-transitory machine-readable medium of claim 16, wherein providing the mobile device access to the WiFi network comprises transmitting a password associated with the WiFi network to the mobile device.

18. The non-transitory machine-readable medium of claim 16, wherein the operations further comprise transmitting, to a mobile device, a request to confirm the terminating of the payment session.

19. The non-transitory machine-readable medium of claim 18, wherein the operations further comprise receiving, from the mobile device, instructions to maintain the payment session after the mobile device is disconnected from the WiFi network to enable the merchant to continue to add additional items to the purchase transaction.

20. The non-transitory machine-readable medium of claim 18, wherein the operations further comprise:
   determining a time limit associated with the payment session has been reached; and
   in response to determining that the time limit has been reached, automatically terminating the payment session to disable the merchant from adding items to the purchase transaction.

* * * * *